United States Patent
Krutz et al.

(10) Patent No.: US 11,542,125 B2
(45) Date of Patent: Jan. 3, 2023

(54) DEVICE AND METHOD FOR WEIGHING A BALLAST ON A CRANE AND CORRESPONDING CRANE

(71) Applicant: LIEBHERR-WERK EHINGEN GMBH, Ehingen/Donau (DE)

(72) Inventors: Robert Krutz, Munderkingen (DE); Hans-Dieter Willim, Ulm-Unterweiler (DE)

(73) Assignee: LIEBHERR-WERK EHINGEN GMBH, Ehingen/Donau (DE)

(*) Notice: Subject to any disclaimer, the term of this patent is extended or adjusted under 35 U.S.C. 154(b) by 758 days.

(21) Appl. No.: 16/479,898

(22) PCT Filed: Feb. 15, 2018

(86) PCT No.: PCT/EP2018/053805
§ 371 (c)(1),
(2) Date: Jul. 22, 2019

(87) PCT Pub. No.: WO2018/149926
PCT Pub. Date: Aug. 23, 2018

(65) Prior Publication Data
US 2019/0389700 A1    Dec. 26, 2019

(30) Foreign Application Priority Data
Feb. 15, 2017 (DE) .......................... 102017001533.3

(51) Int. Cl.
*B66C 13/16* (2006.01)
*G01G 5/04* (2006.01)
(Continued)

(52) U.S. Cl.
CPC ............ *B66C 13/16* (2013.01); *G01G 5/003* (2013.01); *G01G 5/04* (2013.01); *G01G 5/045* (2013.01); *G01G 5/06* (2013.01); *B66C 23/74* (2013.01)

(58) Field of Classification Search
CPC ............ G01G 5/003; G01G 5/06; G01G 5/04; G01G 5/045; B66C 13/16
See application file for complete search history.

(56) References Cited

U.S. PATENT DOCUMENTS

| 5,274,664 A * | 12/1993 | Nigris | H05B 7/156 |
|---|---|---|---|
| | | | 373/105 |
| 2011/0155681 A1 | 6/2011 | Hanahara | |
| 2011/0192815 A1* | 8/2011 | Kurotsu | B66C 23/76 |
| | | | 212/196 |

FOREIGN PATENT DOCUMENTS

| CN | 102249152 A | 11/2011 |
|---|---|---|
| DE | 202014008661 U1 | 1/2015 |

(Continued)

OTHER PUBLICATIONS

ISA European Patent Office, International Search Report Issued in Application No. PCT/EP2018/053805, dated Apr. 24, 2018, WIPO, 4 pages.

*Primary Examiner* — Paul M. West
(74) *Attorney, Agent, or Firm* — McCoy Russell LLP

(57) ABSTRACT

The invention relates to an apparatus for ballast weighing on a crane, comprising at least two ballasting cylinders that are equipped to lift/lower the ballast and that each comprise at least one pressure transducer in the region of the piston and/or rod side, and comprising at least one evaluation unit that is equipped to calculate the mass moved by the ballasting cylinders from the pressures detected by the pressure transducers on retraction and/or extension of the ballasting cylinders, excluding the friction forces occurring in the (Continued)

Figure 1B:
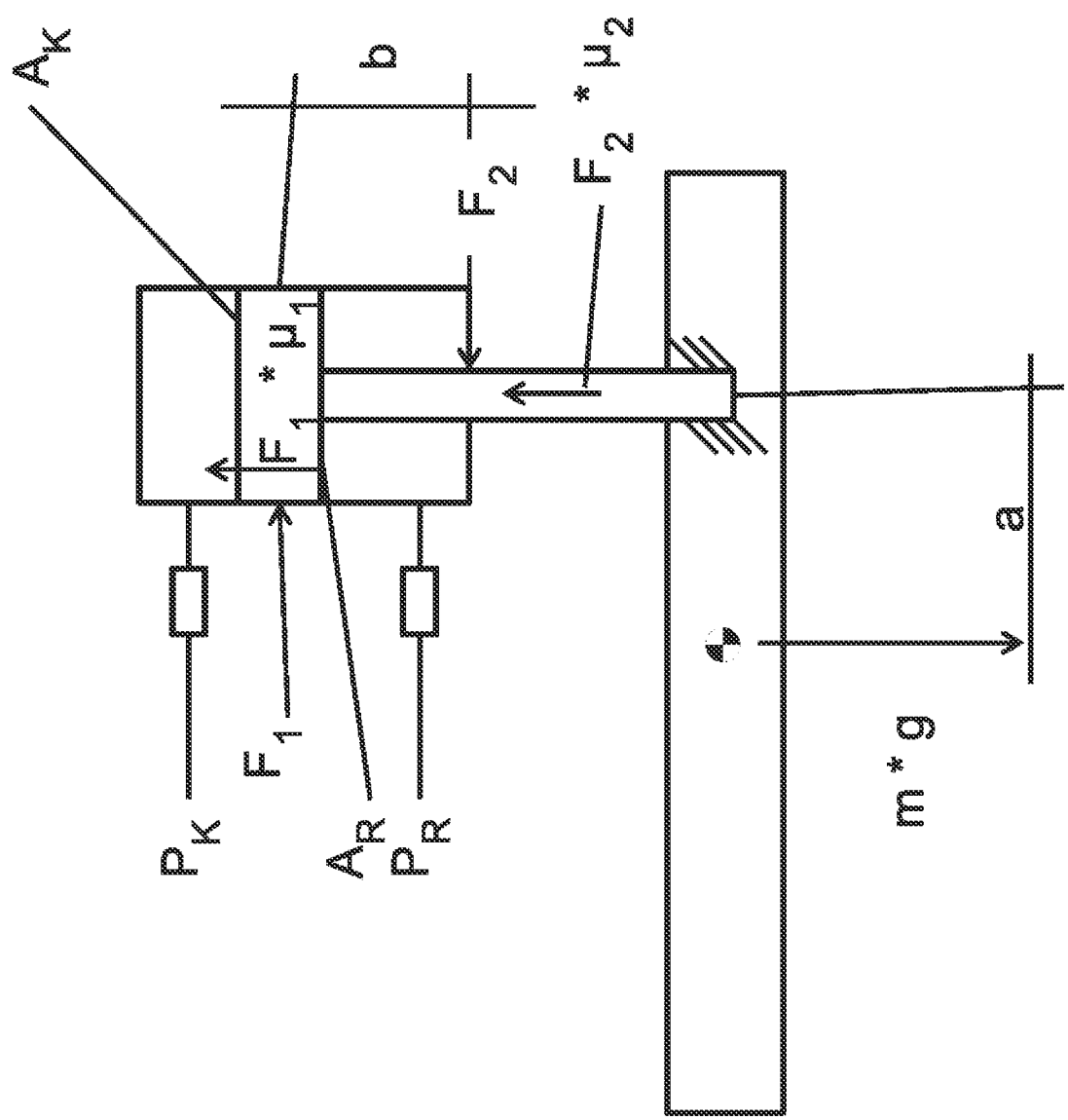

ballasting cylinders. The invention furthermore is directed to a method for calculating the ballast weight of a crane by means of a corresponding apparatus.

11 Claims, 5 Drawing Sheets

(51) Int. Cl.
*G01G 5/00* (2006.01)
*G01G 5/06* (2006.01)
*B66C 23/74* (2006.01)

(56) References Cited

FOREIGN PATENT DOCUMENTS

| DE | 102016203607 A1 | | 9/2017 |
|----|-----------------|---|--------|
| JP | 2012215495 A | * | 11/2012 |
| WO | 9421549 A1 | | 9/1994 |
| WO | 2012163190 A1 | | 12/2012 |

* cited by examiner

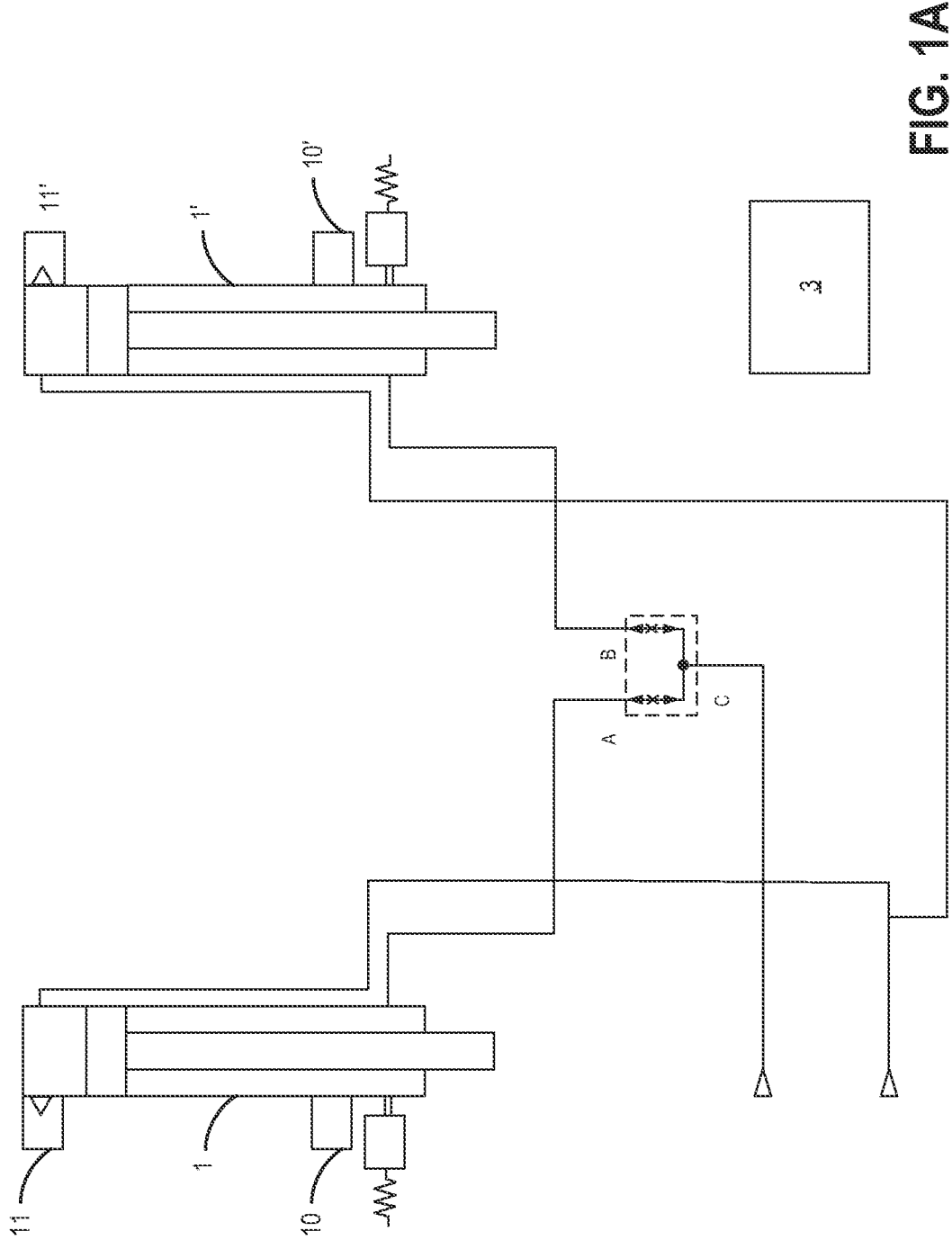

DEVICE AND METHOD FOR WEIGHING A BALLAST ON A CRANE AND CORRESPONDING CRANE

CROSS-REFERENCE TO RELATED APPLICATIONS

The present application is a U.S. National Phase of International Patent Application Serial No. PCT/EP2018/053805 entitled "DEVICE AND METHOD FOR WEIGHING A BALLAST ON A CRANE, AND CORRESPONDING CRANE," filed on Feb. 15, 2018. International Patent Application Serial No. PCT/EP2018/053805 claims priority to German Patent Application No. 10 2017 001 533.3 filed on Feb. 15, 2017. The entire contents of each of the above-referenced applications are hereby incorporated by reference for all purposes.

TECHNICAL FIELD

The invention relates to an apparatus for ballast weighing on a crane, comprising at least two ballasting cylinders that are equipped to lift/lower the ballast and that each comprise at least one pressure transducer in the region of the piston and/or rod side, and comprising at least one evaluation unit that is equipped to calculate the mass moved by the ballasting cylinders from the pressures detected by the pressure transducers on retraction and/or extension of the ballasting cylinders, excluding the friction forces occurring in the ballasting cylinders. The invention furthermore is directed to a method for calculating the ballast weight of a crane by means of a corresponding apparatus.

BACKGROUND AND SUMMARY

The counterweight or ballast weight provides a moment that counteracts the load carried by the crane. Thus, the counterweight substantially contributes to the stability of the crane. When the crane for example is provided with an automatic load moment limitation, the magnitude of the effective counterweight or the mass and the effective lever arm of the counterweight is used in the calculation of the stability of the crane. The terms mass and weight will both be used here, as it is clear to the skilled person how the respectively necessary variable is to be used or converted.

It is known that the crane driver or other operators of the crane manually enter the data necessary for carrying out the load moment limitation. With this procedure it is problematic that errors can occur when manually entering the necessary data and/or the necessary data cannot easily be retrievable.

Against this background it is the object of the invention to provide an apparatus or a method which reduce corresponding incorrect entries and/or can subject the manual entries of a crane driver or another operator to a cross-check or a plausibility check. According to the invention, a completely autarkically operating method or a completely autarkically operating apparatus can also be provided, which render entries made by a crane driver or an operator superfluous.

This object is solved by embodiments described in this disclosure, which is configured for ballast weighing on a crane and comprises at least two ballasting cylinders that are equipped to lift/lower the ballast. Multiple advantageous configurations are also described herein. Accordingly, there is provided an apparatus in which the ballasting cylinders each comprise at least one pressure transducer in the region of the piston and/or rod side, and which furthermore comprises at least one evaluation unit that is equipped to calculate the mass moved by the ballasting cylinders from the pressures detected by the pressure transducers on retraction and/or extension of the ballasting cylinders, excluding the friction forces occurring in the ballasting cylinders.

Advantageously, components already present on a crane, such as said ballasting cylinders, can be used as part of the apparatus according to the invention for determining the ballast weight. The scope of additional necessary components thus can be reduced. It is also conceivable that the evaluation unit is formed as part of a control/regulating unit already provided on the crane. The exclusion of the friction forces occurring in the ballasting cylinders can be effected for example by means of stored friction values that can be used by the evaluation unit and that can be taken into account when calculating the mass.

In a preferred embodiment it can be provided that the pressure transducers are arranged directly in the ballasting cylinders. Pressure-sensitive regions of the pressure transducers can be exposed directly to the pressure medium contained in the ballasting cylinders and therefor need not be coupled to the ballasting cylinders via additional pressure lines or the like, which otherwise would have to be formed as components different from the ballasting cylinders, such as for example external pressure lines. With such an arrangement of the pressure transducers the measurement accuracy can be increased. The measurement accuracy is increased in that a direct pressure measurement can be carried out in the space of the cylinder, which provides more exact measurement values than is the case with a measurement taking place in a region that is guided out of the space of the cylinder via conduits and hence is spaced apart from the cylinder. The arrangement of the pressure transducers in the ballasting cylinders furthermore reduces the risk of damages, as the pressure transducers are better protected by the structure of the ballasting cylinders than would be the case with pressure transducers not arranged within ballasting cylinders.

It is conceivable that the pressure transducers are arranged within lead-throughs in the walls of the ballasting cylinders in order to provide for a pressure measurement as direct as possible.

In another preferred embodiment it is conceivable that exactly one pressure transducer each is arranged on the rod side and one pressure transducer on the piston side of the ballasting cylinders. Due to the pressure measurement thereby possible on both sides of the ballasting cylinders an exact value of the pressure difference between the two sides of the ballasting cylinders can be determined and a value of the force exerted by the ballasting cylinders as exact as possible can be calculated therefrom.

The invention furthermore is directed to a method for calculating the ballast weight of a crane by means of an apparatus. The method comprises the following steps:

detecting the pressures in the ballasting cylinders; and calculating the mass held by means of the ballasting cylinders on the basis of the detected pressures and by taking account of the associated surfaces.

Dimensions of the ballasting cylinders required for calculating the held mass or the surfaces on which the pressure medium acts can be stored or entered in the evaluation unit, so that as explained below a calculation of the forces exerted by the ballasting cylinders is possible by means of the surfaces of the ballasting cylinders charged with the corresponding pressures. The term of the held mass can of course also relate to a mass moved by means of the ballasting cylinders.

According to the method, in exactly one space each of the ballasting cylinders the pressure can be detected and on the basis of these pressures the load on the ballasting cylinders and thus the effective ballast weight can be determined or calculated. The space can be the rod-side or piston-side working space of the ballasting cylinders.

In a preferred embodiment it can be provided that the detection of the pressures in the ballasting cylinders is effected on retraction and/or extension of the ballasting cylinders; wherein in particular a calculation of pressure differences in the ballasting cylinders is effected on the basis of the pressures detected on retraction and/or extension.

It is conceivable that to increase the accuracy of the calculation pressures are detected in each space of the ballasting cylinders and the pressure detection is effected both on retraction and on extension of the ballasting cylinders. By calculating the pressure differences, the measurement accuracy of the calculation furthermore can be increased.

In a preferred embodiment it is conceivable that the method comprises the following step:

carrying out a plausibility check, wherein the calculated mass is compared with an in particular manually entered mass.

The mass of the ballast weight hence can be entered by an operator into the evaluation unit or into another calculating unit and/or control/regulating unit and/or be checked according to the method. When it is detected according to the method that a difference exists between calculated mass and manually entered mass, which exceeds a limit value, a warning can be issued for example by means of the evaluation unit and/or the operation of the crane can be restricted. What is also conceivable is an automatic entry of the weight or the mass of the ballast, wherein a correspondingly provided detection device detects the weight of attached ballast bodies and provides the same to the evaluation unit or provides the same for carrying out the plausibility check.

A possible division of a ballast recognition can also be included in the plausibility check. For example, weights of 2, 6, 10, 14 or 18 tons can be used as possible ballast weights. When the control or evaluation unit has determined a value of for example 2.4 tons according to the present invention, it can fix the ballast for the load moment limitation or the actual ballast weight at 2 tons. The admissible fuzziness for the allocation of the actual ballast weight in addition can be variable depending on the situation. For example, the influence of the ambient temperature can likewise be included.

In another preferred embodiment it is conceivable that the method comprises the following step:

use of the calculated mass in the load moment limitation of the crane.

The use of the calculated mass and other variables relates to the use of the calculated value of the mass for carrying out further method steps. The load moment limitation can be equipped to inhibit a movement of the crane on exceedance of a particular load and/or to issue warnings in order to avoid unstable conditions of the crane. For this purpose, the load moment limitation must know the effective ballast weight in order to therefrom determine or calculate admissible positions or loads of the crane and prevent the crane from tilting forwards or backwards or from falling back. This can occur for example when the boom is set too steep for the effective ballast.

In another preferred embodiment it is conceivable that the method comprises the following step:

measuring the temperature of the fluid medium and compensating temperature-related influences on the calculated mass.

The temperature of the fluid medium or the hydraulic medium can be measured for example within the ballasting cylinders and/or within lines leading to the ballasting cylinders and/or away from the ballasting cylinders. As different viscosities of the medium at different temperatures of the hydraulic medium can be taken into account, the temperature detection allows to take account of temperature-related influences on the pressure conditions in the apparatus or to determine corresponding compensation values or correction values from stored tables or the like and use the same for correcting the calculated mass or for compensating errors in a further calculation step.

The same applies for an alternative or additional compensation of friction influences on the calculated mass.

In another preferred embodiment it is conceivable that the method comprises the following step:

bracing the ballast with a turntable of the crane after ballasting has been effected.

Bracing can be carried out between the processes of retraction and/or extension or after completion of the retraction or extension of the ballasting cylinders. In the present case, ballasting can be regarded as the method of the invention for calculating the ballast weight.

The invention furthermore is directed to a crane with embodiments of the a apparatus described above.

Figure 2:
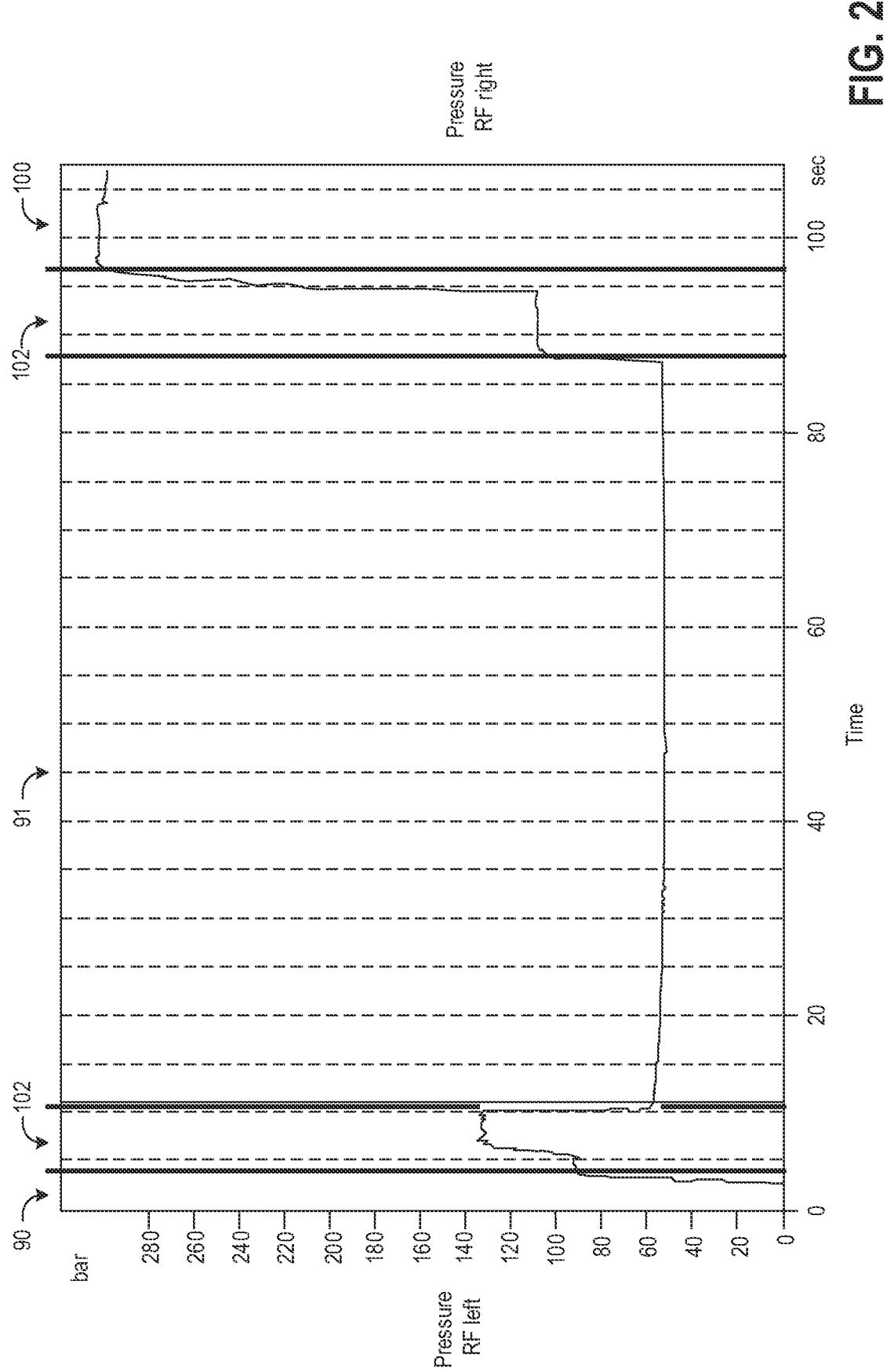
Figure 3A:
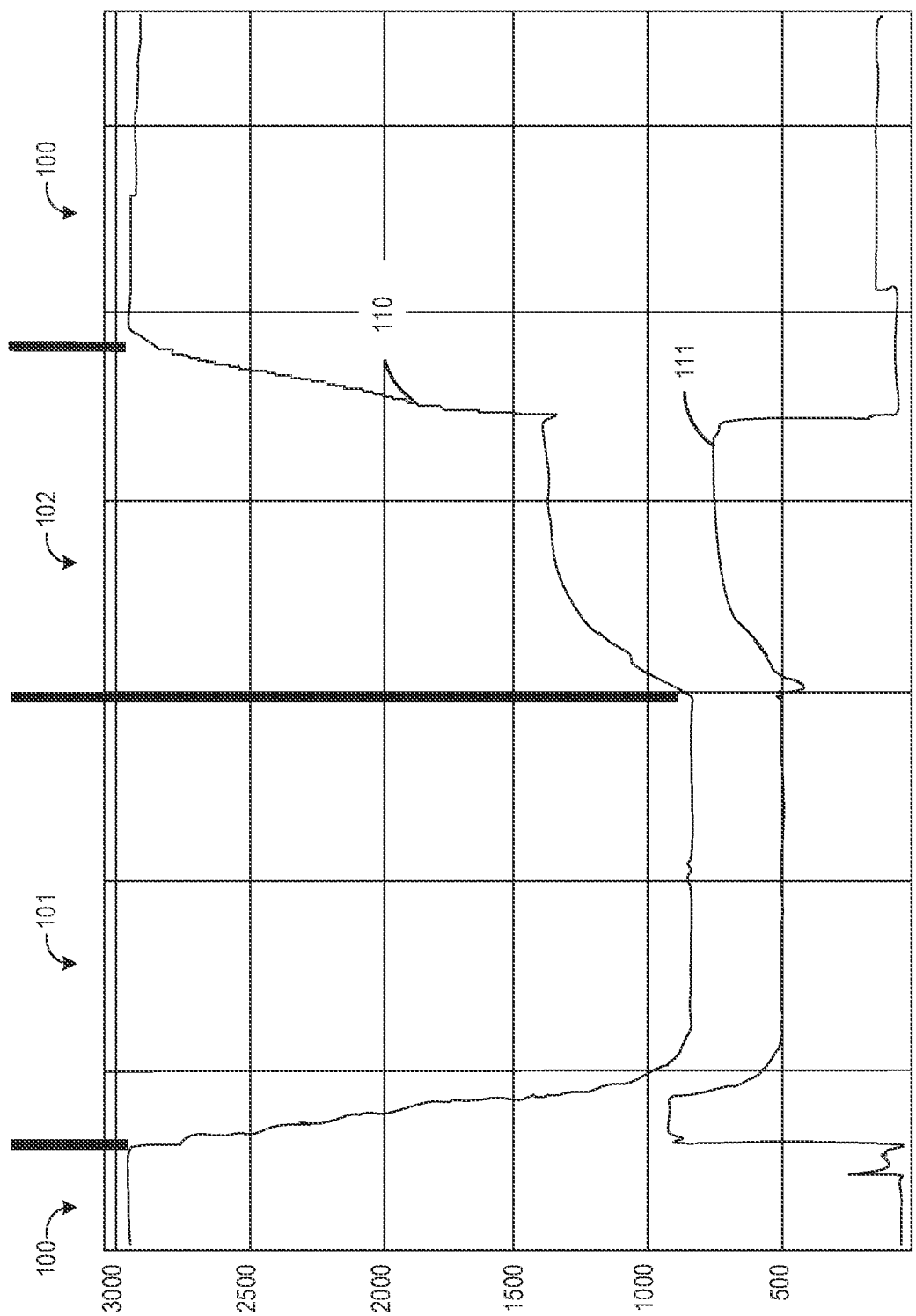
Figure 3B:
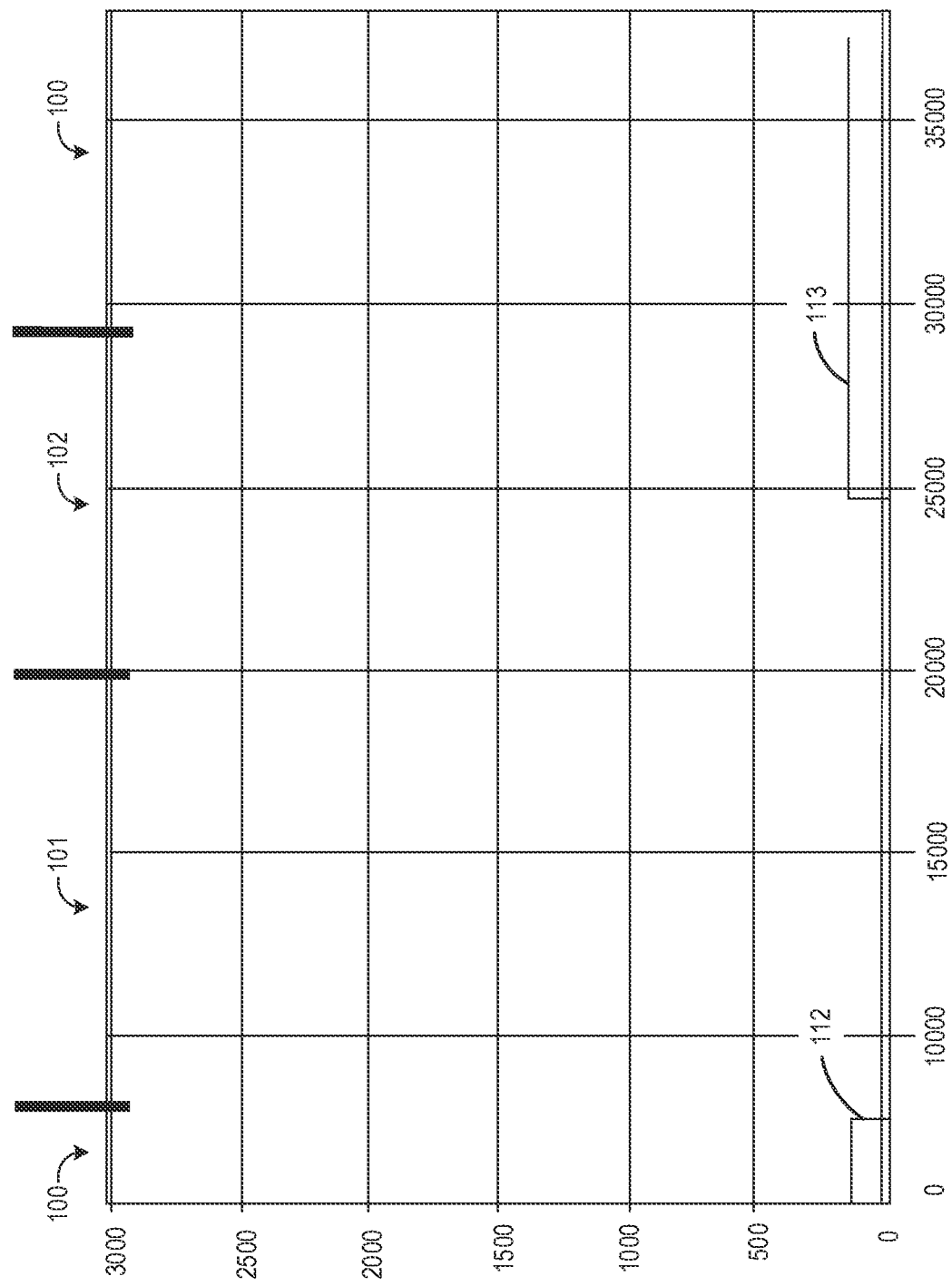

Further details and advantages of the invention will be explained in detail with reference to the embodiment shown in the Figures. by way of example. In the drawings:

FIGS. 1A, 1B: show schematic representations of two apparatuses according to the invention;

FIG. 2: shows a first pressure-time diagram of a method according to the invention;

FIGS. 3a, 3b: show second pressure-time diagrams of a method according to the invention.

FIG. 1a is a schematic representation of an apparatus for ballast weighing on a crane. There is shown a left ballasting cylinder 1 and a right ballasting cylinder 1' for lifting a non-illustrated ballast 2. The ballasting cylinders 1, 1' each comprise at least one pressure transducer 10, 10', which each are arranged in the region of the piston and/or rod side of the ballasting cylinders 1, 1'. Further pressure transducers 11, 11' can be provided on the piston side of the ballasting cylinders 1, 1'. Depending on whether there is a configuration with one pressure transducer or with two pressure transducers per ballasting cylinder 1, 1', either the pressure difference between the two pressure transducers of a ballasting cylinder 1, 1' or the absolute pressure measured on an individual pressure transducer can be determined or used in accordance with the invention.

The pressure transducers 10, 11; 10', 11' can be coupled with an evaluation unit 3. The evaluation unit 3 is equipped to calculate the mass moved by the ballasting cylinders 1, 1' from pressures detected by at least two of the pressure transducers 10, 11; 10', 11' on retraction and/or extension of the ballasting cylinders 1, 1'.

The counterweight provides a moment acting against the crane load or the load lifted by the crane. Thus, the counterweight substantially contributes to the stability of the crane. A load moment limitation of the crane uses the magnitude of the effective counterweight (mass and effective lever arm) in the calculation of the stability of the crane and can prevent the crane from tipping over backwards or forwards at inadmissible crane positions. Tipping backwards can happen when the boom of the crane is set too steep for the effective ballast. So far, the crane operator has entered the data manually. To avoid incorrect entries here, there will be provided an apparatus that at least subjects the entries of the crane operator to a cross-check or plausibility check. In the best case, the device should be able to operate completely autarkically and render an entry by the crane operator superfluous.

In both ballasting cylinders 1, 1' one pressure transducer 10, 11; 10', 11' each can be mounted on the ring and piston surface. By means of a pressure measurement in particular in the ring and/or piston space (on retraction and extension of the ballasting cylinders 1, 1') the mass hanging on the ballasting cylinders 1, 1' can be determined.

The pressure transducers 10, 11; 10', 11' can be mounted directly in the cylinder and need to be connected to the same via lines. The measurement accuracy thereby is increased, so that line losses and temperature errors can largely be avoided.

A temperature measurement and a correction of the pressure values with reference to the temperature values and taking account of a friction factor can likewise be provided.

FIG. 1B shows an embodiment of the invention in which at least one piston rod of the ballasting cylinders 1, 1' is clamped in the ballast. The symbolically shown center of gravity of the ballast device thereby can be disposed away from the longitudinal axis of the piston rod by the amount a. When using two ballasting cylinders 1, 1', the center of gravity of the ballast device can lie outside the plane defined by the longitudinal axes of the ballasting cylinders 1, 1'.

In the exemplary embodiment shown in FIG. 1B, the following applies for the retraction of the ballasting cylinder:

$$m_e * g = P_R * A_R - P_K * A_K + F_1 * \mu_1 + F_2 * \mu_2$$

For the case of extension the following applies:

$$m_a g = P_R * A_R - P_K * A_K - F_1 * \mu_1 - F_2 * \mu_2$$

Furthermore, it applies:

$$m = (m_e + m_a)/2; \quad F_1 = F_2 \text{ and } \mu_1 \sim \mu_2; \quad m * g * a = F_1 * b$$

wherein m is the weight of the ballast device and the further parameters can be taken from the Figure. Here, the parameters P represent pressure values, the parameters A represent corresponding surfaces of the ballasting cylinder, the parameters F represent forces, and the indices K and R relate to piston-side or ring-side parameters.

FIG. 2 shows the pressure profile in an exemplary embodiment of the invention, in which only one pressure sensor 10, 10' or pressure transducer 10, 10' is provided per ballasting cylinder 1, 1'. The pressure profile of the ring side correspondingly is shown by the pressure transducers 10, 10'. Due to asymmetries, the pressure on the left and right is of different magnitude. The diagram is divided into 5 sections. The section 90 shows the region "ballast at the bottom". Here, the ballast rests on the undercarriage. The section 102 shows the region "retract ballast". Here, the ballasting cylinders 1, 1' are retracted and move the ballast to the top. The section 91 shows a region "standstill", in which ballast hangs on the ballasting cylinders 1, 1' with its entire weight. The ballast touches neither an uppercarriage nor an undercarriage of the crane. In this region, the pressure measurement is effected by a simplified method for example at 55 seconds. The second section 102 again shows "retract ballast". The section 100 shows the region "ballast is at the top". Here, the ballasting cylinders 1, 1' press the ballast against the uppercarriage of the crane.

In the following, calculation examples with only one pressure transducer 10, 10' in each ring space now are indicated with reference to FIG. 2.

1. Measured Values (Measurement Values):
    Pressure on ring surface to the right: 57.1 bar
    Pressure on ring surface to the left: 51.1 bar
2. Force Calculation:
    Force of cylinder to the right [N]:
    Pressure on ring surface to the right * ring surface * 10
    57.1 bar * 233.26 cm$^2$* 10=133193.3N
    Force of cylinder to the left [N]:
    Pressure on ring surface to the left * ring surface * 10
    51.1 bar * 233.26 cm$^2$* 10=119197.5N
3. Total Force [kN]:
    Force of cylinder to the left+force of cylinder to the right
    (133193.3N+119197.5N)/1000=252.39 kN
4. Ballast Determination:
    Determined mass [to]: total force/9.81
    252.39 kN/9.81=25.72 to
5. Difference to Actual Ballast:
    Actual ballast 26 to
    Determined ballast: 25.72 to
    Deviation: 280 kg In this case it is possible to take account of the pressure in the ring space and the force thereby exerted on the piston. Of course, the above example is applicable analogously when merely one pressure transducer 11, 11' each is present in the piston spaces of the ballasting cylinders. Depending on the alignment of the ballasting cylinders 1, 1' relative to the crane, pressure transducers can be arranged in those work spaces of the ballasting cylinders 1, 1' that are pressurized by the mass of the ballast.

To further increase the accuracy, a sequence of movements of the ballasting cylinders 1, 1' can be effected automatically. The starting position is a condition in which the ballast to be mounted on the uppercarriage of the crane is stacked on the undercarriage in the mounting position, and the connecting means between ballasting cylinder 1, 1' and ballast overlap each other to such an extent that the ballasting operation can be terminated by solely retracting the ballasting cylinders 1, 1'. The ballasting cylinders 1, 1' carry out these movements as soon as the crane operator for example presses the key "lift ballast". The sequence of movements can continue on its own as long as the crane operator keeps the key pressed. An acoustic feedback can be provided.

Initially, the ballasting cylinders 1, 1' are extended for example for half a second-piston or piston rod possibly are "stuck" the first time. Subsequently, the ballasting cylinders 1, 1' are retracted and the ballast 2 is pulled up. There is a rise in pressure on the ring surface, until the ballast 2 is lifted from the undercarriage.

When the ballast 2 is lifted from the undercarriage, a constant pressure is obtained. Subsequently, the ballast 2 can be braced, the pressure in the ring surface rising in the process. Shortly before the ballasting operation is completed, the measurement sequence for ballast weighing is initiated.

In the process, the ballast 2 again is extended for a certain time. The ballast 2 hangs freely in the air and is held exclusively by the ballasting cylinders 1, 1'. On extension of the ballasting cylinders 1, 1' the pressure in the ring and piston surface is measured, e.g. at 15000 ms, as can be taken from FIG. 3. From the measured pressures a differential force is calculated on extension of the ballasting cylinder.

Subsequently, the ballasting cylinders 1, 1' are retracted again and the ballast 2 is lifted. Here as well, a pressure measurement is effected on retraction in the ring and piston space, e.g. at nearly 25000 ms. From the measured pressures a differential force is calculated on retraction of the ballasting cylinders 1, 1'.

From the differential forces, a mass that represents the attached ballast 2 is determined on retraction and extension.

In both ballasting cylinders 1, 1' one pressure transducer 10, 11; 10', 11' each can be mounted on the ring and piston surface. By means of a pressure measurement in the ring and piston surface (on retraction and extension of the ballasting cylinders 1, 1') the mass hanging on the ballasting cylinders 1, 1' can be determined.

One more factor can be taken into account in order to again improve the determined result, similar to the luffing cylinder pressure measurement for the weighing operation. Furthermore, a temperature compensation can also be included in the calculation.

FIGS. 3A and 3B describe the method in which during the pressure measurement in the ballasting cylinders 1, on retraction of the ballasting cylinders 1, 1' and subsequently on extension of the ballasting cylinders 1, 1' an improvement can be achieved by deducting the friction in the measurement.

The sections shown in FIG. 3A correspond to the sections shown in FIG. 2. What is new in FIG. 3A is the section 101. Here, the ballasting cylinders 1, 1' are extended and move the ballast away from the uppercarriage. The two curves 110 show the pressure profile on the ring side of the ballasting cylinders 1, 1'. They are tapped by the pressure transducers 10 and 10'. The two curves 111 show the pressure profile on the piston side of the ballasting cylinders 1, 1'. They are tapped by the pressure transducers 11 and 11'.

The sections shown in FIG. 3B correspond to the sections shown in FIG. 3A. FIG. 3B shows the "weighed ballast" stored in the control unit. At the beginning of the measurement an old value 112 for the "weighed ballast" is present. When the measurement cycle according to the invention starts, i.e. on transition from section 100 into section 101, the old value is cancelled. At nearly 25000 ms, the control unit has determined the new value 113 for the "weighed ballast" by means of the method according to the invention and has stored the same in the control unit. The control unit can of course be identical to the evaluation unit 3.

The force occurring on the ring surface on retraction of the ballasting cylinders 1, 1' can be calculated as follows by way of example:

Force on ring surface of cylinder to the right [N]: pressure on ring surface to the right * ring surface * 10

$$161.0 \text{ bar} * 40.25 \text{ cm}^2 * 10 = 64802.5 N$$

Force on ring surface of cylinder to the left [N]: pressure on ring surface to the left * ring surface * 10

$$161.7 \text{ bar} * 40.25 \text{ cm}^2 * 10 = 65084.25 N$$

Total force on ring surface [kN]: force of cylinder to the left+force of cylinder to the right $$(64802.5N + 65084N)/1000 = 129.89 \text{ kN}$$

The force occurring on the piston surface on retraction of the ballasting cylinders 1, 1' can be calculated as follows by way of example:

Force on piston surface of cylinder to the left/right [N]: pressure on piston surface to the left/right * ring surface * 10

$$23.5 \text{ bar} * 103.87 \text{ cm}^2 * 10 = 24409.45 N$$

Total force on piston surface [kN]: force of cylinder to the left+force of cylinder to the right $$(24409.45N + 24409.45N)/1000 = 48.82 \text{ kN}$$

The differential force on retraction of the ballasting cylinders 1, 1' can be calculated as follows by way of example:

Total force [kN]: total force on ring surface [kN]—total force on piston surface [kN]:

$$129.89 \text{ kN} - 48.82 \text{ kN} = 81.07 \text{ kN}$$

The force on the ring surface on extension of the ballasting cylinders 1, 1' (at 15 sec) can be calculated as follows by way of example:

Force on ring surface of cylinder to the right [N]: pressure on ring surface to the right * ring surface * 10

$$235.0 \text{ bar} * 40.25 \text{ cm}^2 * 10 = 94587.5 N$$

Force on ring surface of cylinder to the left [N]: pressure on ring surface to the left ring surface * 10

$$235 \text{ bar} * 40.25 \text{ cm}^2 * 10 = 94587.5 N$$

Total force on ring surface [kN]: force of cylinder to the left+force of cylinder to the right $$(94587.5N + 94587.5N)/1000 = 189.17 \text{ kN}$$

The force on the piston surface on extension of the ballasting cylinders 1, 1' (at 15 sec) can be calculated as follows by way of example:

Force on piston surface of cylinder to the left/right [N]: pressure on piston surface to the left/right * ring surface * 10

$$59.5 \text{ bar} * 103.87 \text{ cm}^2 * 10 = 61802.65 N$$

Total force on piston surface [kN]: force of cylinder to the left+force of cylinder to the right $$(61802.65N + 61802.65N)/1000 = 123.61 \text{ kN}$$

The differential force on extension of the ballasting cylinders (at 15 sec) can be calculated as follows by way of example:

Total force [kN]: total force on ring surface [kN]—total force on piston surface [kN]:

$$189.17 \text{ kN} - 123.61 \text{ kN} = 65.56 \text{ kN}$$

Determined mass [t]: ((differential force on extension+differential force on retraction)/2)/9.81

$$((81.07 \text{ kN} + 65.56 \text{ kN})/2)/9.81 = 7.47 \text{ to}$$

Difference to actual ballast: actual ballast 7.36 to
determined ballast: 7.47 to
deviation: 110 kg The practical procedure of ballasting can be as follows: Ballast rests on the undercarriage and the signal "ballast at the bottom" is available. The ballast weight calculated last is zeroed.

The operator activates the key "lift ballast" on an operating control unit or on an operating unit (key remains pressed). Initially, the ballasting cylinders are extended for a defined time period—cylinders possibly are "stuck" the first time. Subsequently, the ballast is retracted by the ballasting cylinders (ballast is pulled up). There is a rise in pressure on the ring surface, until the ballast is lifted from the undercarriage.

When the ballast 2 is lifted from the undercarriage, a constant pressure is obtained. Subsequently, the ballast is braced, and the pressure in the ring and piston surface rises. Shortly before the ballasting operation is completed, the measurement sequence for ballast weighing is initiated. In the process, the ballast is extended again for a certain time (ballast hangs freely in the air). On extension of the ballasting cylinder or the ballasting cylinders 1, 1', the pressure in the ring and piston surface is measured. From the measured pressures a differential force is calculated on extension of the ballasting cylinder. Subsequently, the ballast is retracted again; here as well a pressure measurement is made on retraction. From the measured pressures a differential force is calculated on retraction of the ballasting cylinder. From the differential forces, a mass that represents the attached ballast is determined on retraction and extension.

The invention claimed is:

1. An apparatus for ballast weighing on a crane, comprising:
   at least two ballasting cylinders that are equipped to lift/lower the ballast, each ballasting cylinder comprises at least one pressure transducer in the region of the piston and/or rod side, and
   at least one evaluation unit configured to calculate the mass moved by the ballasting cylinders from the pressures detected by the pressure transducers on retraction and extension of the ballasting cylinders, excluding the friction forces occurring in the ballasting cylinders.

2. The apparatus according to claim 1, wherein the pressure transducers are arranged directly in the ballasting cylinders.

3. The apparatus according to claim 1, wherein exactly one pressure transducer each is arranged on the rod side and one pressure transducer on the piston side of the ballasting cylinders.

4. The apparatus of claim 1, wherein a force calculated based on pressures detected during the retraction and a force calculated based on pressures detected during the extension are averaged to calculate the mass.

5. A method for calculating the ballast weight of a crane by means of an apparatus according to claim 1, comprising the following steps:
   detecting the pressures in the ballasting cylinders; and
   calculating the mass held by means of the ballasting cylinders on the basis of the detected pressures and by taking account of the associated surfaces.

6. The method according to claim 5, wherein
   the detection of the pressures in the ballasting cylinders is effected on retraction and extension of the ballasting cylinders, and
   a calculation of pressure differences in the ballasting cylinders is effected on the basis of the pressures detected on retraction and extension.

7. The method according to claim 5, further comprising the following step:
   carrying out a plausibility check, wherein the calculated mass is compared with a manually entered mass.

8. The method according to claim 5, further comprising the following step:
   use of the calculated mass in the load moment limitation of the crane.

9. The method according to claim 5, further comprising the following step:
   measuring the temperature of the fluid medium and compensating temperature-related influences on the calculated mass.

10. The method according to claim 5, further comprising the following step:
    bracing the ballast with a turntable of the crane after ballasting has been effected.

11. A crane with an apparatus according to claim 1.

* * * * *